United States Patent [19]

Sumino et al.

[11] Patent Number: 5,000,966

[45] Date of Patent: Mar. 19, 1991

[54] QUALITY IMPROVEMENT OF ALCOHOLIC LIQUORS BY ENZYMATIC DECOMPOSING OF ETHYL CARBAMATE

[75] Inventors: Yasuhiro Sumino, Kobe; Shigeya Kakimoto, Kawanishi; Shun-ichi Akiyama, Fujisawa, all of Japan

[73] Assignee: Takeda Chemical Industries, Ltd., Osaka, Japan

[21] Appl. No.: 282,044

[22] Filed: Dec. 9, 1988

[30] Foreign Application Priority Data

Dec. 11, 1987 [JP] Japan .................................. 62-314882
Nov. 11, 1988 [JP] Japan .................................. 63-286428

[51] Int. Cl.$^5$ .......................... C12G 1/00; C12G 3/08; C12N 11/04
[52] U.S. Cl. ........................................ 426/12; 424/13; 435/174; 435/182; 435/195; 435/262; 435/822; 435/829; 435/830; 435/850; 435/852; 435/874; 435/911; 435/921
[58] Field of Search .......................... 426/12; 424/13; 435/262, 174, 182, 195, 822, 829, 830, 850, 852, 874, 911, 921

[56] References Cited

U.S. PATENT DOCUMENTS 3,733,205  5/1973  Shovers et al. .................. 426/12 X
4,708,875 11/1987  Godtfredsen et al. ............... 426/12
4,844,911  7/1989  Kakimoto et al. ................ 426/12 X

OTHER PUBLICATIONS

Takebe et al., Abstracts of the 61st Meeting of the Japanese Biochemical Society, Abstract No. 415412, Oct. 3 to Oct. 6, 1988.
Williams et al., Chemical Abstracts, vol. 105, No. 24, Dec. 15, 1986, p. 323, No. 214067n.
Ritzman et al., Schweizrische Zeitschrift Für Obst-und Weinhau, vol. 123, No. 22, 1986, pp. 595-597.
Patent Abstracts of Japan, vol. 1, No. 140, p. 3179C77, JP-A-52-90698, Jul. 30, 1977.

*Primary Examiner*—David M. Naff
*Attorney, Agent, or Firm*—Wenderoth, Lind & Ponack

[57] ABSTRACT

Ethyl carbamate in an alcoholic liquor is decomposed by contacting the alcoholic liquor with a culture broth or processed matter thereof obtained from a microorganism which belongs to the genus *Gluconobacter, Flavobacterium, Arthrobacter, Achromobacter, Alcaligenes, Pseudomonas, Klebsiella, Rhodotorula, Rhodosporidium, Trichosporon* or *Candida,* and is capable of decomposing ethyl carbamate. The alcoholic liquor is improved in quality, and has a low ethyl carbamate content.

16 Claims, 2 Drawing Sheets

QUALITY IMPROVEMENT OF ALCOHOLIC LIQUORS BY ENZYMATIC DECOMPOSING OF ETHYL CARBAMATE

This invention relates to a method of improving the quality of alcoholic liquors.

In alcoholic liquors, all brewed beverages such as refined sake, beer, wine, samshu or the like, and spirits such as whisky, brandy, shochu or the like, there is contained ethyl carbamate which is considered as being a carcinogenic substance. For people who regularly drink alcoholic liquors, it is desired that the content of the carcinogenic substance be as low as possible.

The reason why ethyl carbamate is produced in alcoholic liquors has not been elucidated. And, no method of removing ethyl carbamate from alcoholic liquors has been known.

As mentioned in the foregoing, the development of a method of removing ethyl carbamate from alcoholic liquors with the resulting practical advantage has been desired.

For producing alcoholic liquors containing a relatively low content of ethyl carbamate, the present inventors diligently searched for microorganisms capable of decomposing ethyl carbanate and succeeded in obtaining such microorganisms. They found that, by treating alcoholic liquors with the microorganism enzyme they could efficiently remove ethyl carbamate. The study was further carried out to accomplish the present invention.

The present invention relates to (1) a method of improving the quality of alcoholic liquors, which comprises treating alcoholic liquors containing ethyl carbamate with an enzyme capable of decomposing ethyl carbamate, and (2) a method of improving the quality of alcoholic liquors, which comprises bringing a culture broth or processed matter thereof obtained from a microorganism which belongs to the genus Gluconobacter, Rhodotorula, Rhodosporidium, Trichosporon, Candida, Flavobacterium, Arthrobacter, Achromobacter, Alcaligenes, Pseudmonas or Klebsiella and is capable of decomposing ethyl carbamate, into contact with alcoholic liquors containing ethyl carbamate.

As the enzyme capable of decomposing ethyl carbamate, any one can be employed so long as it decomposes ethyl carbamate to produce one or more of ammonia, carbon dioxide gas and ethanol. There is no particular limitation with respect to the general properties of the enzyme, such as optimal pH, pH stability, optimal temperature, thereno-stability, substrate specificity, etc.

In the present invention, there is no particular limitation with respect to the microorganisms capable of decomposing ethyl carbamate. It is only required that they have, in the culture broth or its processed matter, an activity of decomposing ethyl carbamate as mentioned above. Examples of strains of such microorganisms include bacteria belonging to e.g. the genus Gluconobacter, Flavobacterium, Arthrobacter, Achromobacter, Alcaligenes, Pseudomonas or Klebsiella or yeasts belonging to e.g. Rhodotorula, Rhodosporidium, Trichosporon or Candida. As representable ones are mentioned *Gluconobacter albidus, Flavobacterium meningosepticum, Arthrobacter ramosus, Achromobacter xerosis, Alcaligenes faecalis, Pseudomonas oleovorans or Klebsiella pneumoniae; Rhodotorula glutinis, Rhodotorula minuta var. texensis, Rhodotorula rubra, Rhodosporidium toruloides, Trichosporon cutaneum, Candida parapsilosis, Candida intermedia, Candida guilliermondii, Candida krusoides, Candida catenulata.* There is no limitation with respect to these strains, and, even those newly isolated from soil, foodstuffs, animals, plants, etc., can be employed in the method of this invention, so long as they are capable of decomposing ethyl carbamate. In addition, variants obtained artificially from the strains by UV irradiation or by treatment with mutagens, and other microbial cells obtained by recombination of the artificially separated gene fragments necessary for expression of the said decomposition activity can be employed in the method of this invention.

Specific examples of strains producing enzymes capable of decomposing ethyl carbamate are mentioned below:

*Gluconobacter albidus* IFO 3250
*Rhodotorula glutinis* IFO 1501
*Rhodotorula minuta var. texensis* IFO 1541
*Rhodotorula rubra* IFO 0910
*Rhodosporidium toruloides* IFO 10032
*Trichosporon cutaneum* IFO 1198
*Trichosporon cutaneum* IFO 1200
*Candida parapsilosis* IFO 0708
*Candida parapsilosis* ATCC 7336
*Candida intermedia* IFO 0761
*Candida guilliermondii* IFO 0838
*Candida krusoides* ATCC 7345
*Candida krusoides* ATCC 10755
*Candida catenulata* IFO 0745
*Flavobacterium meningosepticum* IFO 12535
*Arthrobacter ramosus* IFO 12958
*Achromobacter xerosis* IFO 12668
*Alcaligenes faecalis* IFO 13111
*Pseudomonas oleovorans* IFO 13583
*Klebsiella pneumoniae* IFO 13703

The above IFO numbers mean the accession numbers at Institute for Fermentation, Osaka (IFO) located at 17-85, Juso-honmachi 2-chome, Yodogawa-ku, Osaka, and these strains are known ones listed, on "List of Cultures, 7th edition, 1984 and 8th edition 1988" published by the said Institute. The ATCC numbers mean the accession numbers at American Type Culture Collection (ATCC) located at 12301 Parklawn Drive Rockville, Md. 20852, and these strains are known ones listed on "ATCC Catalogue of FUNGI/YEASTS, 16th edition, 1984".

Enzymes capable of decomposing ethyl carbamate are produced from these strains continuously or intermittently by conventional standing culture, aeration-spinner culture or solid culture, among others The culture media used are those of conventional composition wherein the microorganisms used can grow. The carbon sources are appropriately selected from carbohydrates, oils and fats, fatty acids, organic acids or alcohols which can be utilized, and are used independently or in combination. The nitrogen sources include organic nitrogen sources such as peptone, soybean flour, cotton seed flour, corn steep liquor, yeast extract, meat extract, malt extract, when, urea, etc., and inorganic nirogen sources such as ammonium sulfate, ammonium chloride, ammonium nitrate, ammonium phosphate, etc., which are used independently or in appropriate combination upon necessity. It is desirable that, in addition to the carbon sources and nitrogen sources, essential growth factors or growth promoters such as minerals, amino acids and vitamins are added to the media. To induce the production of the enzyme capable of decomposing ethyl carbamate, ethyl carbamate or its analogues or related compounds thereof, for example, carbamyl phosphate, biuret, etc., or an amide compound such as acetamide, butylamide, acrylamide, lactamide, or the like may, depending on cases, further be added. For the control of pH and foam during the cultivation, it is effective to supplement appropriately a caustic alkali solution, a sodium carbonate solution, or calcium salts, or to add an antifoaming agent.

The temperature of cultivation is selected from the range suitable for growth of the microorganisms used, this being usually 15° C. to 55° C., preferably 25° C. to 45° C. Cultivation is continued for a time sufficient for growth of the microorganisms used and for production of the enzyme capable of decomposing ethyl carbamate, usually for 5 to 120 hours. Thus, the culture broth of the microorganisms capable of decomposing ethyl carbamate referred to in the present invention can be obtained.

The processed matter of the culture broth referred to in the present invention means an authentic specimen containing an enzyme system effective for decomposition of ethyl carbamate, e.g. viable cells, entrapped cells, mashed cells, crude or refined enzyme, insoluble enzyme, etc., prepared from the culture broth obtained by such a method as described above. Examples of the said processed matter include (1) viable cells collected form the culture by centrifugation, sedimentation, aggregation, filtration through porous membrane, poly membrane, ceramic membrane, etc., (2) dried cells of the said viable cells as they are, or those prepared by freeze-drying, spray drying, acetone drying, etc. after killing the cells by heating, chemical treatment, etc.; (3) crude or purified enzyme preparations with higher specific activity than the viable cells, obtained by solubilizing the cells by freeze-thawing, grinding, ultrasonication, osmotic shock, cell-wall-digestion, treating with a surfactant, etc., separately or in combination, and then purifying by means of an appropriate combination of conventional techniques for purification of enzymes, such as protamine treatment, salting out, treatment with an organic solvent, isoelectric precipitation, electrophoresis, ion-exchange chromatography, gel filtration, affinity chromatography, crystallization, etc., and (4) cells entrapped in natural polymers such as agar, carrageenan, etc., or in synthetic polymers such as polyacrylamide, urethane resin, etc., or an immobilized preparation obtained by binding to a carrier such as activated charcoal, ceramic, dextran, agarose and its related substances, porous glass, etc. When this immobilized enzyme preparation is produced, some other proteins or sugars, an SH group-protecting agent, a chelating agent, an anti-oxidant, an analogue of the substrate, etc. may optionally be added for stabilization of the enzyme.

In the present invention, the culture broth of the microorganisms capable of decomposing ethyl carbamate or its processed matter obtained by such a method as mentioned above is brought into contact with an alcoholic liquor containing ethyl carbonate to decompose and remove ethyl carbamate in the alcoholic liquor.

The alcoholic liquor to be treated with the method in the present invention is one containing ethyl carbamate, including brewed wines such as refined sake, beer, wine, samushu, etc., spirits such as whisky, brandy, shochu (Japanese spirit), etc., and the intermediate products thereof.

When these alcoholic liquors are to be treated with the enzyme capable of decomposing ethyl carbamate, it is practically advantageous that the enzyme capable of decomposing ethyl carbamate is added at a level of 0.0001 unit to 100 units, especially 0.01 unit to 1 unit relative to 1 ml of the alcoholic liquor.

The activity of decomposing ethyl carbamate in the culture broth or its processed matter was determined colorimetrically by the nitroprusside method on ammonia produced by the reaction at 30° C. for 30 minutes of the mixture of a volume of a suspension of the cells in sterilized deionized water collected by centrifugation of the culture which had been diluted appropriately, with an equal volume of 0.2M citrate buffer (pH 5.5) containing ethyl carbamate. The amount of enzyme to produce one micromole of ammonia per unit time (one minute) is expressed as 1 unit (1U).

The temperature of the treatment of the alcoholic liquor is usually 10° C. to 80° C., preferably 10° C. to 60° C. The pH is 2 to 7, desirably 3 to 6. The treatment is continued for a time sufficient for allowing ethyl carbamate in the alcoholic liquor to disappear, usually for 20 minutes to 200 days, preferably 5 hours to 120 days.

The enzyme which decomposes ethyl carbamate in the alcoholic liquor treated by the method of this invention can be removed from the alcoholic liquor usually by means of, e.g., filtration. In this case, a filter aid or a settling agent, activated charcoal, etc., may optionally be added, then the mixture is subjected to filtration by the aid of a filter cloth. Further, for example, precision filtration or ultrafiltration is an effective means.

According to the present invention, ethyl carbamate in alcoholic liquors can be easily decomposed, thus providing alcoholic liquors of good quality, the content of ethyl carbamate being low, for example not higher than 100 ppb in the case of refined sake, not higher than 150 ppb in the case of whisky or not higher than 30 ppb in the case of wine. The method of this invention is, therefore, a remarkably useful one from the practical viewpoint.

Figure 2:
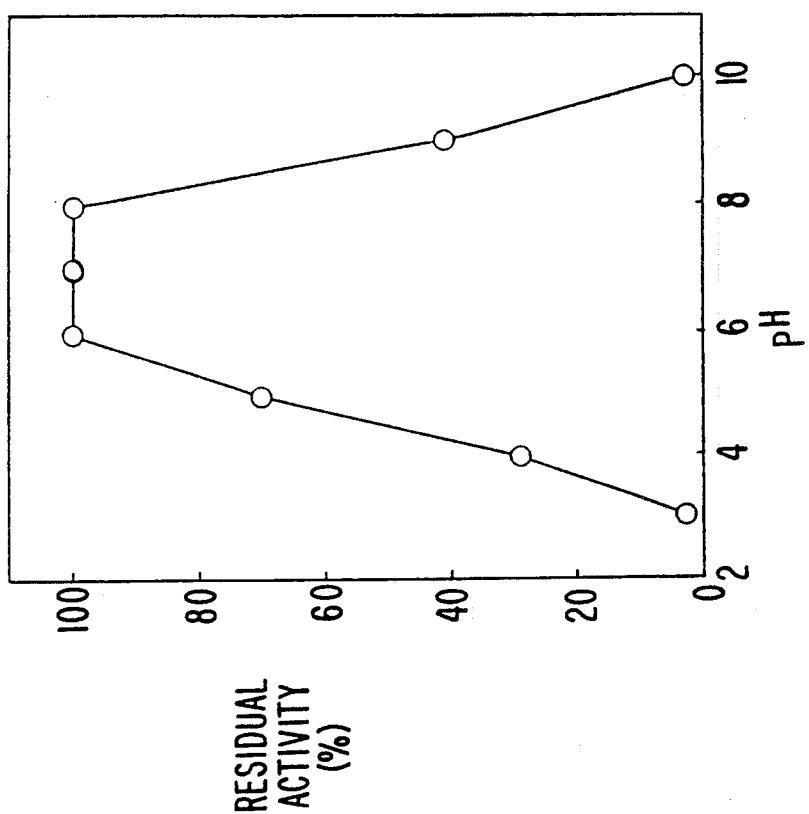
FIGS. 1 and 2 are graphs illustrating the relations between pH and the enzyme activity regarding the enzyme obtained by Example 5 hereinafter.

In the following working example, the present invention is illustrated in more concrete manner These examples are merely illustrative examples and do not limit the scope of the present invention.

The amount of ethyl carbamate contained in the alcoholic liquors was determined by means of gas chromatography in accordance with the method of Frank L. Joe, Jr. et al. [disclosed on Journal of the Association of Official Analytical Chemists, J. AOAC, 60, 509 (1977)].

EXAMPLE 1

*Trichosporon cutaneum* IFO 1198 grown on a commercially available YM agar medium (manufactured by Difco Co., Ltd.) was inoculated into a 200 ml-Erlenmeyer flask containing 25 ml of a sterilized seed medium (pH 5.5) consisting of glucose (0.25%), potassium monophosphate (0.5 %), ammonium sulfate (0.5%), yeast extract (0.2%), table salt (0.01%), calcium chloride (dihydrate) (0.2%), magnesium sulfate (heptahydrate) (0.05%) and n-butylamide (0.25%), and was incubated at 28° C. for 24 hours under shaking. The resulting seed culture (25 ml) was transferred into a 200 ml-Erlenmeyer flask containing a sterilized medium of the same composition as described above, followed by incubating at 28° C. for 3 days under shaking. The activity of the culture broth for decomposing ethyl carbamate was determined as 0.005 U/ml enzyme potency. This culture broth was subjected to centrifugation to collect cells. These cells were added to a commercially available refined sake (alcohol 17%, ethyl carbamate 148 ppb, pH 4.3) so that the concentration might be 0.01 U/ml or 0.05 U/ml, which was kept at 28° C. to cause decomposition of ethyl carbamate in the refined sake. The results are shown in Table 1.

TABLE 1

| Decomposition activity (U/ml) | Change of concentration of ethyl carbamate in refined sake Days elapsed | | | | |
| --- | --- | --- | --- | --- | --- |
| | 0 | 2 | 4 | 6 | 10 |
| 0.01 | 148 | 86 | 44 | 25 | 16 |
| 0.05 | 148 | 24 | 0 | 0 | 0 |

EXAMPLE 2

The strains listed in the following Table 2, grown on ally available YM agar media (manufactured by Difco Co., Ltd.), were incubated in the same manner as in Example 1. The activities of these cultures for decomposing ethyl carbamate were determined and the results are shown in Table 2.

TABLE 2

| Activities of culture broth for decomposition of ethyl carbamate | |
| --- | --- |
| Strain | (U/ml) |
| Trichosoron cutaneum IFO 1200 | 0.004 |
| Rhodotorula glutinis IFO 1501 | 0.001 |
| Rhodotorula minuta var. texensis IFO 1541 | 0.001 |
| Rhodotorula rubra IFO 0910 | 0.002 |
| Gluconobacter albidus IFO 3250 | 0.004 |
| Rhodosporidium toruloides IFO 10032 | 0.001 |
| Candida parapsilosis IFO 0708 | 0.006 |
| Candida parapsilosis ATCC 7336 | 0.005 |
| Candida intermedia IFO 0761 | 0.003 |
| Candida guilliermondii IFO 0838 | 0.002 |
| Candida krusoides ATCC 7345 | 0.006 |
| Candida krusoides ATCC 10755 | 0.006 |
| Candida catenulata IFO 0745 | 0.006 |

The culture broth of each strain in Table 2 was subjected to centrifugation to collect cells, which were added to the same commercially available refined sake as in Example 1 so that the activity might be 0.02 U/m. The respective mixtures were kept at 28° C. for 7 days while stirring occasionally. The concentrations of ethyl carbamate in refined sake were as follows:

TABLE 3

| Concentration of ethyl carbamate after treatment (ppb) | |
| --- | --- |
| Cluconobacter albidus IFO 3250 | 94 |
| Rhodotorula rubra IFO 0910 | 66 |
| Rhodotorula glutinis IPO 1501 | 82 |
| Rhodotorula minuta var. texensis IFO 1541 | 48 |
| Rhodosoridium toruloides IFO 10032 | 22 |
| Trichosporon cutaneum IFO 1200 | 15 |
| Candida parapsilosis IFO 0708 | 0 |
| Candida parapsilosis ATCC 7336 | 12 |
| Candida intermedia IFO 0761 | 22 |
| Candida guilliermondii IFO 0838 | 38 |
| Candida krusoides ATCC 7345 | 0 |
| Candida krusoides ATCC 10755 | 0 |

TABLE 3-continued

| Concentration of ethyl carbamate after treatment (ppb) | |
| --- | --- |
| Candida catenulata IFO 0745 | 3 |

EXAMPLE 3

(1) The strains listed in the following Table 4, grown on a nutrition agar medium, were transferred into a 200 ml-Erlenmeyer flask containing 25 ml of a sterilized seed medium (pH 4.5) consisting of glucose (0.25%), potassium monophsphate (0.03%), polypeptone (0.25%), table salt (0.5%) and formylamide (0.1%), and were cultivated at 30° C. for 48 hours. Each of the resulting seed cultures (25 ml) was transferred into a 1l-Erlenmyer flask containing 250 ml of a sterilized medium of the same composition as described above, followed by incubating at 30° C. for 3 days under shaking. The activity of the culture broths for decomposing ethyl carbamate were determined and the results are shown in Table 4.

TABLE 4

| Activities of culture broth for decomposition of ethyl carbamate | |
| --- | --- |
| Strain | (U/ml) |
| Flavobacterium meninoosepticum IFO 12535 | 0.002 |
| Arthrobacter ramosus IFO 12958 | 0.001 |
| Achromobacter xerosis IFO 12668 | 0.001 |
| Alcaligenes faecalis IFO 13111 | 0.001 |

(2) Pseudomonas oleovorans IFO 13583, grown on a nutrition agar medium, was inoculated into a 200 ml-Erlenmeyer flask containing 25 ml of a sterilized seed medium (pH 4.5) consisting of dipotassium phosphate (0.1%), magnesium sulfate (heptahydrate) (0.02%), calcium carbonate (0.1%), ferrous sulfate (0.01%), sodium molybdate (0.0005%), table salt (0.02%) and ethyl carbate (0.5%), and was incubated at 30° C. for 72 hours under shaking. The resulting seed culture (25 ml) was transferred to a 1l-Erlenmeyer flask containing 250 ml of a sterilized medium having the same composition as described above, followed by incubation at 30° C. for 3 days under shaking. The activity of the culture broth for decomposing ethyl carbamate was determined as 0.005 U/ml.

(3) Klebsiella pneumoniae IFO 13703 grown on a nutrition agar medium was inoculated into a 200 ml-Erlemneyer flask containing 25 ml of a sterilized seed medium (pH 5.5) consisting of ammonium sulfate (0.2%), monopotassium phosphate (0.6%), dipotassium phosphate (1.4%), magnesium sulfate (heptahydrate) (0.02%), sodium citrate (0.1%) and ethyl carbamate (0.5%), and was incubated at 30° C. for 48 hours under shaking. The resulting seed culture (25 ml) was transferred to a 1l-Erlemneyer flask containing 250 ml of a sterilized medium having the same composition as described above, followed by incubation at 30° C. for 3 days under shaking. The activity of the culture broth for decomposing ethyl carbamate was determined as 0.001 U/ml.

Each culture broth obtained in the manner described above (1), (2) and (3) was subjected to centrifugation to collect cells. The collected cells were fully washed with physiological saline solution and then washed with distilled water. These cells were added to a test wine (ethyl carbamate content of 120 ppb), which was prepared by adding ethyl carbamate to a commercially available white wine (alcohol 12%), pH 3.2), so that the concentration might be 0.05 U/ml. This wine was kept at 20° C. for 20 days to decompose ethyl carbamate; the results are shown in Table 5.

TABLE 5

The concentration of ethyl carbamate after treatment

| Strains | | Residual concentration (ppb) |
| --- | --- | --- |
| Flavobacterium meningosepticum | IFO 12535 | 18 |
| Arthrobacter ramosus | IFO 12958 | 27 |
| Achromobacter xerosis | IFO 12668 | 25 |
| Alcaligenes faecalis | IFO 13111 | 25 |
| Pseudomonas oleovorans | IFO 13583 | 12 |
| Klebsiella pneumoniae | IFO 13703 | 21 |
| None | | 120 |

EXAMPLE 4

Candida krusoides ATCC 7345 was cultivated in the same manner as described in Example 1 and the obtained culture broth (1l) was subjected to centrifugation to collect cells, followed by washing with physiological saline solution. The mass of collected wet cells (5 g) was suspended in 15 ml of physiological saline solution, followed by mixing with 15 ml of sterilized sodium alginate solution (1%) and then was added dropwise into calcium chloride solution (1%) to give entrapped cells. The thus obtained entrapped cells, which were filtered and washed with water, were dipped into 30 ml of a test whisky (ethyl carbamate content 229 ppb) prepared by adding ethyl carbamate to a commercially available whisky (alcohol 43%, pH 4.8) at an enzyme activity of 0.04 U/ml and kept at 30° C. for 20 days. After that, the residual amount of ethyl carbamate was determined. The result was 81 ppb.

EXAMPLE 5

Candida krusoides ATCC 7345 was cultivated in the same manner as described in Example 1 to give 2 l of a culture broth having an activity of 0.007 U/ml for decomposing ethyl carbamate. The cells were collected from the culture broth by centrifugation, washed with 0.05M phosphate buffer (pH 7.2) twice, suspended in a solution containing 1 mM of EDTA and 1 mM of dithiothreitol, broken down by treating with a cell mill containing glass beads having 0.1–0.2 mm in diameter and were treated at 4500 rpm for 20 minutes The treated product was centrifuged and to the supernatant was added ammonium sulfate so that the concentration comes to 90%. The precipitate was collected by centrifugation, dissolved in 0.05M phosphate buffer (pH 7.0) containing 1 mM 2-mercapto ethanol, adsorbed on a sephadex-G 200 column (4.5 cm in diameter, 150 cm in length) buffered with the above mentioned buffer solution and eluted with the buffer solution to collect the active fractions. This showed a specific activity of 0.0032 U/ml protein and the activity yield was 43.6%.

The enzymological and chemical properties are as follows (1) Substrate specificity This acts on ethyl carbamate, and in addition on methyl carbamate and formaldehyde.

| substrate specificity | |
| --- | --- |
| Substrate | Relative activity (%) |
| Ethyl carbamate | 100 |
| Methyl carbamate | 90 |
| Butyl carbamate | 6 |
| Urea | 0 |
| Formamide | 94 |

(2) Optimal pH and pH stability

Figure 1:
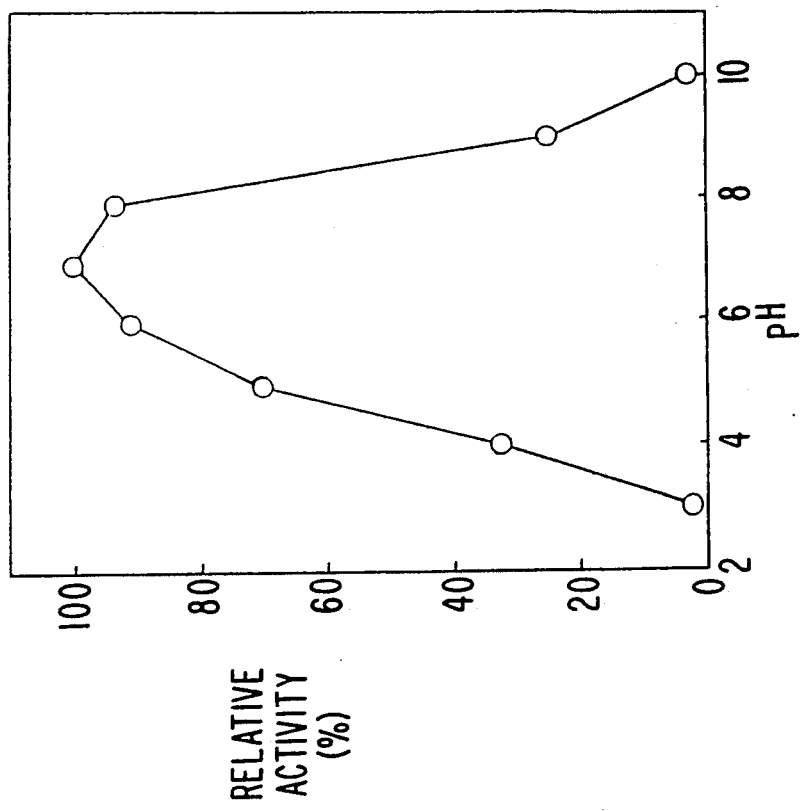
Figure 4:
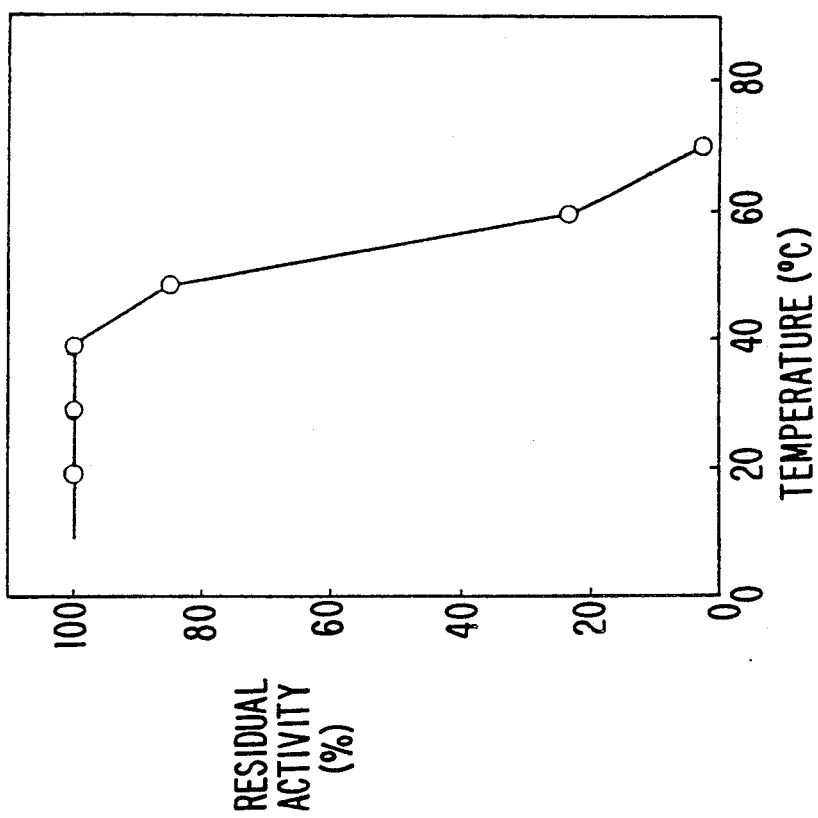
FIGS. 3 and 4 are graphs illustrating the relations between temperature and enzyme activity regarding the said enzyme.
Figure 3:
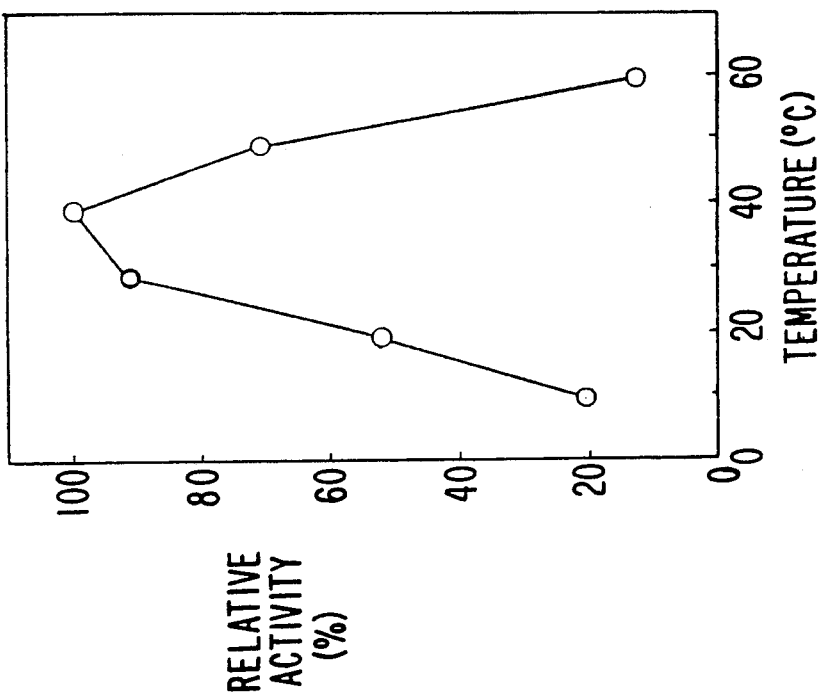

As shown in FIG. 1, the optimal pH is 7. FIG. 2 shows residual activities when kept at 37° C. for 15 minutes. A is clear from FIG. 2, the enzyme is stable at pH 6–8.

(3) Inhibitors

As shown in Table 7, the enzymatic action is inhibited by salts of metals such as mercury, iron, copper and zinc.

TABLE 7

| | Inhibitors | |
| --- | --- | --- |
| Inhibitors | Concentration (mM) | Relative activity (%) |
| $HgCl_2$ | 5 mM | 49 |
| $FeCl_3 \cdot nH_2O$ | 5 mM | 14 |
| $CuSO_4 \cdot 5H_2O$ | 5 mM | 54 |
| $ZnSO_4 \cdot 7H_2O$ | 5 mM | 26 |
| None | | 100 |

(5) Km value

The Km value is 65 mM (pH 4, 0.2M citrate buffer)

This crude enzyme was added to the commercially available refined sake as mentioned in Example 1 so that the concentration might be 0.05 U/ml, which was kept at 37° C. for 5 days to cause decomposition of ethyl carbamate. The concentration of ethyl carbamate was 14 ppb.

What we claim:

1. A method of improving the quality of an alcoholic liquor, which comprises bringing a preparation containing an enzyme capable of decomposing ethyl carbamate produced by a microorganism which belongs to the genus Gluconobacter, Flavobacterium, Arthrobacter, Achromobacter, Alcaligenes, Pseudomonas, Klebsiella, Rhodotorula, Rhodosporidium, Trichosporon or Candida, into contact with an alcoholic liquor containing ethyl carbamate, thereby reducing the quantity of ethyl carbamate and subsequently obtaining the alcoholic liquor having reduced ethyl carbamate content.

2. The method according to claim 1, wherein the microorganism is Gluconobacter albidus.

3. The method according to claim 1, wherein the microorganism is Flavobacterium meningosepticum.

4. The method according to claim 1, wherein the microorganism is Arthrobacter ramosus.

5. The method according to claim 1, wherein the microorganism is Achromobacter xerosis.

6. The method according to claim 1, wherein the microorganism is Alcaligenes faecalis.

7. The method according to claim 1, wherein the microorganism is Pseudomonas oleovorans.

8. The method according to claim 1, wherein the microorganism is Klebsiella pneumoniae.

9. The method according to claim 1, wherein the microorganism is Rhodotorula glutinis, Rhodotorula minuta var. texensis or Rhodotorula rubura.

10. The method according to claim 1, wherein the microorganism is *Rhodosporidium toruloides*.

11. The method according to claim 1, wherein the microorganism is *Torichosporon cutaneum*.

12. The method according to claim 1, wherein the microorganism is *Candida parapsilosis, Candida intermedia, Candida guilliermondii, Candida krusoides* or *Candida catenulata*.

13. The method according to claim 1, wherein the alcoholic liquor is one selected from the group consisting of refined sake, beer, wine, samush, whisky, brandy and shochu.

14. The method according to claim 1, wherein the enzyme capable of decomposing ethyl carbamate is added at a level of 0.0001 unit to 100 units relative to 1 ml of alcoholic liquor.

15. The method according to claim 1, wherein the preparation is selected from the group consisting of undried viable cells of the microorganism, dried cells of the microorganism, crude enzyme obtained by solubilizing cells of the microorganism or purified enzyme obtained by isolating the enzyme from cells of the microorganism.

16. The method according to claim 1 wherein the preparation is entrapped cells of the microorganism.

* * * * *

UNITED STATES PATENT AND TRADEMARK OFFICE
CERTIFICATE OF CORRECTION

PATENT NO. : 5,000,966

DATED : March 19, 1991

INVENTOR(S) : YASUHIRO SUMINO, SHIGEYA KAKIMOTO, SHUN-ICHI AKIYAMA

It is certified that error appears in the above-identified patent and that said Letters Patent is hereby corrected as shown below:

The title page showing the number of claims should be deleted and substitute therefor the attached title page.

United States Patent [19]

Sumino et al.

[11] Patent Number: 5,000,966

[45] Date of Patent: Mar. 19, 1991

[54] QUALITY IMPROVEMENT OF ALCOHOLIC LIQUORS BY ENZYMATIC DECOMPOSING OF ETHYL CARBAMATE

[75] Inventors: Yasuhiro Sumino, Kobe; Shigeya Kakimoto, Kawanishi; Shun-ichi Akiyama, Fujisawa, all of Japan

[73] Assignee: Takeda Chemical Industries, Ltd., Osaka, Japan

[21] Appl. No.: 282,044

[22] Filed: Dec. 9, 1988

[30] Foreign Application Priority Data

Dec. 11, 1987 [JP] Japan .................................. 62-314882
Nov. 11, 1988 [JP] Japan .................................. 63-286428

[51] Int. Cl.$^5$ ......................... C12G 1/00; C12G 3/08; C12N 11/04
[52] U.S. Cl. ........................................ 426/12; 424/13; 435/174; 435/182; 435/195; 435/262; 435/822; 435/829; 435/830; 435/850; 435/852; 435/874; 435/911; 435/921
[58] Field of Search ........................... 426/12; 424/13; 435/262, 174, 182, 195, 822, 829, 830, 850, 852, 874, 911, 921

[56] References Cited

U.S. PATENT DOCUMENTS 3,733,205  5/1973  Shovers et al. .................. 426/12 X
4,708,875  11/1987 Godtfredsen et al. .............. 426/12
4,844,911  7/1989  Kakimoto et al. ................. 426/12 X

OTHER PUBLICATIONS

Takebe et al., Abstracts of the 61st Meeting of the Japanese Biochemical Society, Abstract No. 415412, Oct. 3 to Oct. 6, 1988.
Williams et al., Chemical Abstracts, vol. 105, No. 24, Dec. 15, 1986, p. 323, No. 214067n.
Ritzman et al., Schweizrische Zeitschrift Für Obst-und Weinhau, vol. 123, No. 22, 1986, pp. 595–597.
Patent Abstracts of Japan, vol. 1, No. 140, p. 3179C77, JP-A-52-90698, Jul. 30, 1977.

*Primary Examiner*—David M. Naff
*Attorney, Agent, or Firm*—Wenderoth, Lind & Ponack

[57] ABSTRACT

Ethyl carbamate in an alcoholic liquor is decomposed by contacting the alcoholic liquor with a culture broth or processed matter thereof obtained from a microorganism which belongs to the genus *Gluconobacter, Flavobacterium, Arthrobacter, Achromobacter, Alcaligenes, Pseudomonas, Klebsiella, Rhodotorula, Rhodosporidium, Trichosporon* or *Candida*, and is capable of decomposing ethyl carbamate. The alcoholic liquor is improved in quality, and has a low ethyl carbamate content.

17 Claims, 2 Drawing Sheets

UNITED STATES PATENT AND TRADEMARK OFFICE
CERTIFICATE OF CORRECTION

PATENT NO. : 5,000,966

DATED : March 19, 1991

INVENTOR(S) : YASUHIRO SUMINO, SHIGEYA KAKIMOTO, SHUN-ICHI AKIYAMA

It is certified that error appears in the above-identified patent and that said Letters Patent is hereby corrected as shown below:

Column 10, beginning at line 15, insert the following:

--17. A method of improving the quality of an alcoholic liquor, which comprises treating an alcoholic liquor containing ethyl carbamate with an enzyme capable of decomposing ethyl carbamate, thereby reducing the quantity of ethyl carbamate and subsequently obtaining the alcoholic liquor having reduced ethyl carbamate content.--

Signed and Sealed this

Thirtieth Day of June, 1992

*Attest:*

DOUGLAS B. COMER

*Attesting Officer*     *Acting Commissioner of Patents and Trademarks*